US012766873B2

(12) United States Patent
Bachmann et al.

(10) Patent No.: US 12,766,873 B2
(45) Date of Patent: Oct. 20, 2026

(54) IDENTIFICATION DOCUMENT AND PRODUCTION METHOD

(71) Applicant: Veridos GmbH, Berlin (DE)

(72) Inventors: Jan-Patrick Bachmann, Munich (DE); Klaus Kohl, Miesbach (DE); Cristina Fabian, Garching (DE); Peter Tarantino, Munich (DE); Carsten Müller, Munich (DE)

(73) Assignee: Veridos GmbH, Berlin (DE)

( * ) Notice: Subject to any disclaimer, the term of this patent is extended or adjusted under 35 U.S.C. 154(b) by 55 days.

(21) Appl. No.: 18/846,167

(22) PCT Filed: Mar. 6, 2023

(86) PCT No.: PCT/EP2023/055610
§ 371 (c)(1),
(2) Date: Sep. 11, 2024

(87) PCT Pub. No.: WO2023/170001
PCT Pub. Date: Sep. 14, 2023

(65) Prior Publication Data

US 2025/0187362 A1 Jun. 12, 2025

(30) Foreign Application Priority Data

Mar. 11, 2022 (DE) ..................... 10 2022 000 858.0

(51) Int. Cl.
*B42D 25/435* (2014.01)
*B42D 25/45* (2014.01)

(52) U.S. Cl.
CPC ........... *B42D 25/435* (2014.10); *B42D 25/45* (2014.10)

(58) Field of Classification Search
CPC ....... B42D 25/435; B42D 25/45; B42D 25/41
(Continued)

(56) References Cited

U.S. PATENT DOCUMENTS 8,006,908 B2 8/2011 Bergmann et al.
2017/0185881 A1 6/2017 Syruanen
2022/0134792 A1 * 5/2022 Kohl .................... B42D 25/405 382/118

FOREIGN PATENT DOCUMENTS

WO WO-2020156759 A1 * 8/2020 ........... B42D 25/309

OTHER PUBLICATIONS

Translation of the International Preliminary Examination Report on Patentability from International Application No. PCT/EP2023/055610 dated Sep. 10, 2024.

(Continued)

*Primary Examiner* — Justin V Lewis
(74) *Attorney, Agent, or Firm* — Frank Rosenberg

(57) ABSTRACT

The invention relates to an identification document (10) for identifying a person with a coloured identification image (50) with a carrier (12) has a personalization area (14) for receiving image information, wherein the personalization area comprises a recording layer (20) for receiving first image information, a lens arrangement (22) for viewing the first image information, and a partially transparent print layer (26) formed on the lens arrangement for receiving second image information. The first image information contains a black-and-white positive image (54) of the person as a first partial image information and a black-and-white negative image (64) of the person as a second partial image information. The positive image (54) and the negative image (64) are each formed from a plurality of partial areas (30, 32) which are arranged in such a nested manner in the recording layer (20) that when viewed through the lens arrangement (22), the positive image (54) is only reconstructed in a substantially vertical viewing direction (36) and the negative image (64) is only reconstructed in a pre-determined, oblique viewing direction (36). The second image information of the partially transparent print layer (26) contains a
(Continued)

Figure 1:
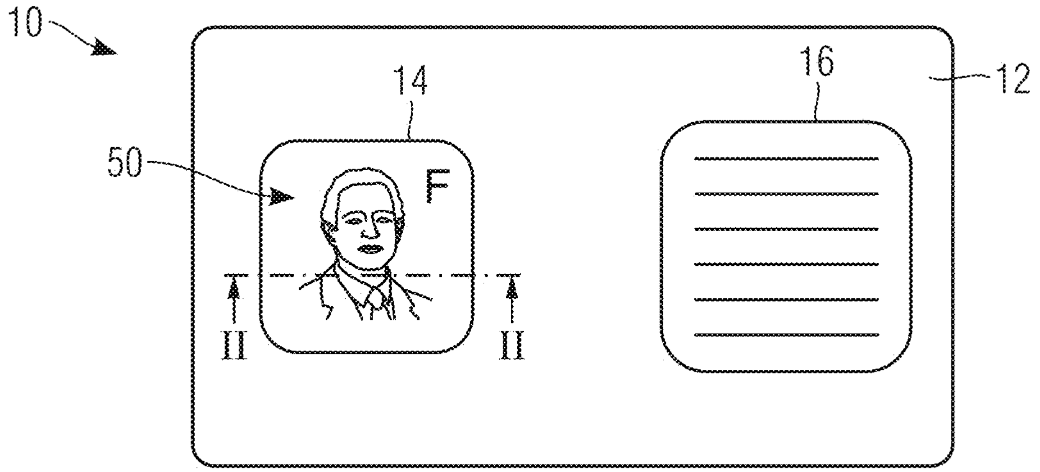

colour separation (52) of the coloured identification image of the person, which is visible in both the vertical (34) and the oblique (36) viewing direction. When viewed vertically, the colour identification image (50) of the person is observable through an interaction of the black-and-white positive image (54) and the colour separation (52), and when viewed obliquely, a colour control image (60) is observable, which is formed through an interaction of the black-and-white negative image (64) and the colour separation (52).

15 Claims, 2 Drawing Sheets

(58) Field of Classification Search
USPC ........ 283/67, 70, 72, 74, 75, 77, 86, 87, 93, 283/94, 98, 109, 112, 901
See application file for complete search history.

(56) References Cited

OTHER PUBLICATIONS

Translation of the Written Opinion of the International Search Authority from International Application No. PCT/EP2023/055610 date of mailing: Jun. 2, 2023.

Translation of the International Search Report from International Application No. PCT/EP2023/055610 dated May 26, 2023.

* cited by examiner

IDENTIFICATION DOCUMENT AND PRODUCTION METHOD

RELATED APPLICATIONS

This application is a National Stage entry of International Patent Application. No. PCT/EP2023/055610, filed on 6 Mar. 2023 which claims the priority benefit of German Patent Application Ser. No. DE 10 2022 000 858.0 filed 11 Mar. 2022.

The invention relates to an identification document for identifying a person with a coloured identification image, as well as a production method for such an identification document.

Identification documents such as ID cards, credit cards or bank cards should, due to their legitimation function, offer the greatest possible security against forgery or falsification and yet be comparatively simple and inexpensive to produce.

The publication WO 2020/156 759 A1 discloses an identification document with biometric image information, in which a lens arrangement is provided above a recording layer through which the biometric image information is viewed. The biometric image information contains a base image and a derivative image derived from the base image, which shows or emphasizes a component of the base image that is essential for recognition, so that when the combined image information from the base image and the derivative image is perceived, a three-dimensional overall impression of the content of the base image is formed.

Proceeding from this, the invention is based on the object of further improving an identification document of the type mentioned initially, in particular to provide an identification document with a high level of forgery security and an attractive visual appearance.

This object is achieved by the features of the independent claims. Further developments of the invention are the subject of the dependent claims. According to the invention, a generic identification document contains a carrier which has a personalization area for receiving image information. The personalization area has a recording layer for receiving a first image information, a lens arrangement for viewing the first image information and a partially transparent print layer formed on the lens arrangement for receiving a second image information.

The first image information of the recording layer contains a black-and-white positive image of the person as a first partial image information and a black-and-white negative image of the person as a second partial image information. The positive image and the negative image are each formed from a plurality of partial areas which are arranged in such a nested manner in the recording layer that when viewed through the lens arrangement, the positive image is only reconstructed in a substantially vertical viewing direction and the negative image is only reconstructed in a predetermined, oblique viewing direction.

The second image information of the partially transparent print layer contains a colour separation of the coloured identification image of the person, which is visible both when viewed vertically and obliquely.

When the identification document is viewed vertically, the coloured identification image of the person is observable through the interaction of the black-and-white positive image of the recording layer and the colour separation of the partially transparent print layer. When viewed from an oblique viewing direction, a coloured control image is observable, which is formed through the interaction of the black-and-white negative image of the recording layer and the colour separation of the partially transparent print layer.

The recording layer is advantageously formed by a laser-modifiable layer which is modified, in particular blackened, by laser exposure in the partial areas forming the positive image and the negative image. The laser-modifiable layer advantageously contains an infrared absorber, such as soot particles, which lead to local blackening of the recording layer when exposed to an IR laser, for example an Nd:YAG laser or a $CO_2$ laser.

In an advantageous embodiment, the identification image of the person is not observable from the pre-determined, oblique viewing direction and the control image is not observable when viewed vertically.

According to an advantageous embodiment of the invention, the partially transparent print layer is formed by a rasterized print layer, in particular a rasterized print layer with opaque raster elements and transparent intermediate spaces. However, it is also possible to form the partially transparent print layer by a full-surface translucent print layer.

The partially transparent print layer is preferably applied directly to the lens arrangement. Furthermore, it is advantageously provided that the lens arrangement is formed by a relief structure with elevations and depressions between the elevations. In the preferred case that the partially transparent print layer is formed by a rasterized print layer, the raster elements of the partially transparent print layer are advantageously arranged at least partially, preferably predominantly, in the depressions of the relief structure. As a result of arranging them partially or predominantly in the depressions of the lens arrangement, the raster elements of the partially transparent print layer are particularly well protected from environmental influences and mechanical damage. Typically, in a freshly produced identification document, raster elements of the partially transparent print layer are located both on the elevations and in the depressions of the relief structure. Due to wear and tear, after prolonged use, for example several years of use, predominantly the raster elements arranged in the depressions remain. The rasterized print layer is therefore advantageously configured and applied to the relief structure in such a manner that the raster elements arranged in the recesses alone have a high colour density sufficient for reliable identification of the person.

In an advantageous further development, the black-and-white negative image of the person in the recording layer is combined with alphanumeric information which, when viewed through the lens arrangement, is also only reconstructed in the pre-determined, oblique viewing direction and is not observable when viewed vertically. The alphanumeric information is advantageously in black-and-white like the negative image. It can contain, for example, the name and/or date of birth of the person, but also document-related information such as a document number, an issue date, country information and the like.

The alphanumeric information of the black-and-white negative image is advantageously repeated on the identification document outside the personalization area, for example in a bibliography area of the identification document, in a window or an applied patch or strip. The alphanumeric information of the black-and-white negative image can also be linked to information provided outside the personalization area and, for example, together with this information can be supplemented to form a complete piece of information. These measures further increase protection against counterfeiting, since a consistent change in the information contained in the negative image and the information contained outside the personalization area represents a high technical hurdle.

In an advantageous embodiment, the positive image and the negative image are each formed from a plurality of narrow strips which are alternately present in the recording layer.

The colour separation of the partially transparent print layer is advantageously arranged in a registered manner with respect to the positive image and negative image of the recording layer formed by the plurality of partial areas. This ensures that the positive image of the recording layer and the colour separation of the partially transparent print layer complement each other from the vertical viewing direction to form the coloured identification image of the person, and that the negative image of the recording layer and the colour separation of the partially transparent print layer complement each other in the pre-determined oblique viewing direction to form the coloured control image.

In an advantageous embodiment, it is provided that the partial areas, in particular the strips of the positive image and the negative image, are spaced apart from one another in the recording layer. When viewing the identification document, there is then a neutral viewing direction area between the vertical viewing direction and the pre-determined oblique viewing direction, in which neither the positive image nor the negative image is reconstructed.

The lens arrangement is advantageously formed by a plurality of parallel cylindrical lenses, in particular by cylindrical lenses with a width below the resolution limit of the human eye, preferably with a width of 165 μm or less, particularly preferably 100 μm or less.

The invention also includes a method for producing an identification document of the type mentioned, in which

- a colour identification image of a person is provided and is broken down into a colour separation and a black-and-white portion, wherein the black-and-white portion of the identification image represents a black-and-white positive image of the person,
- the black-and-white positive image of the person is inverted in its contrast to obtain a black-and-white negative image of the person,
- a document blank is provided with a carrier which has a personalization area with a laser-sensitive recording layer for receiving a first image information and a lens arrangement for viewing the first image information of the recording layer,
- the document blank is exposed to laser radiation from a vertical direction through the lens arrangement in order to introduce the black-and-white positive image into first partial areas of the recording layer,
- the document blank is exposed to laser radiation from the pre-determined oblique exposure direction through the lens arrangement in order to introduce the black-and-white negative image into second, different partial areas of the recording layer, and
- a partially transparent print layer is formed on the lens arrangement, which contains the colour separation of the identification image as second image information.

Further exemplary embodiments and advantages of the invention are explained below with reference to the figures, in which a true-to-scale and true-to-proportion reproduction was dispensed with in order to increase clarity.

Figure 2:
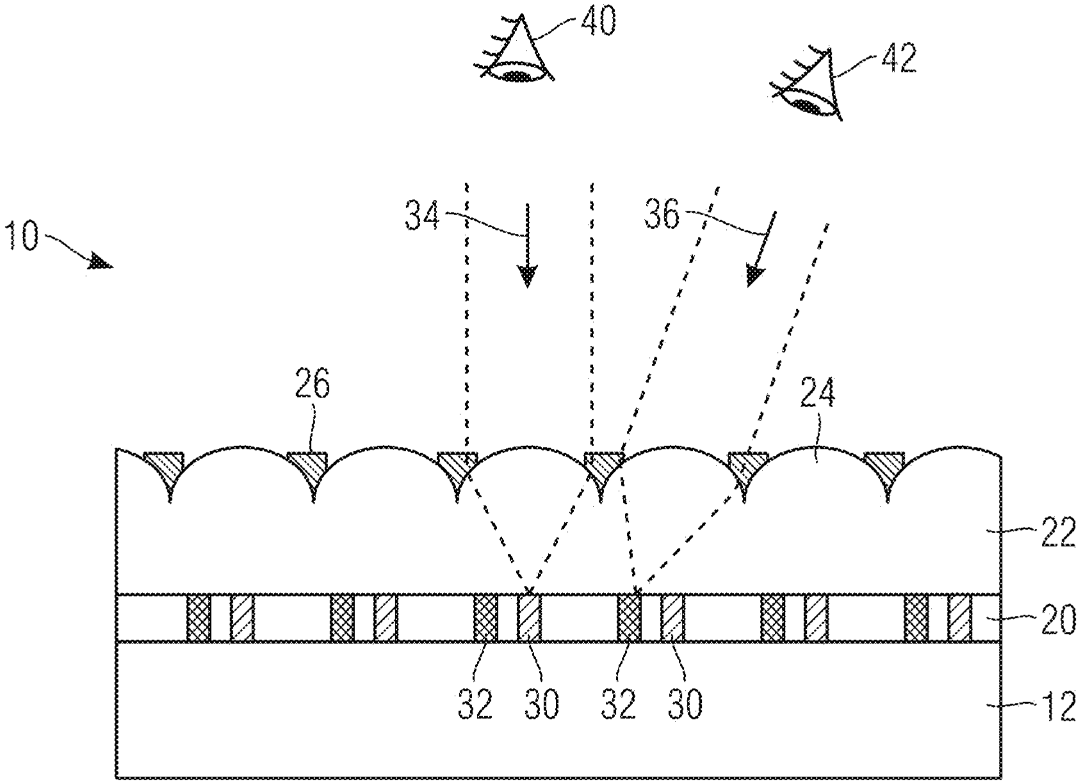
Figure 3:
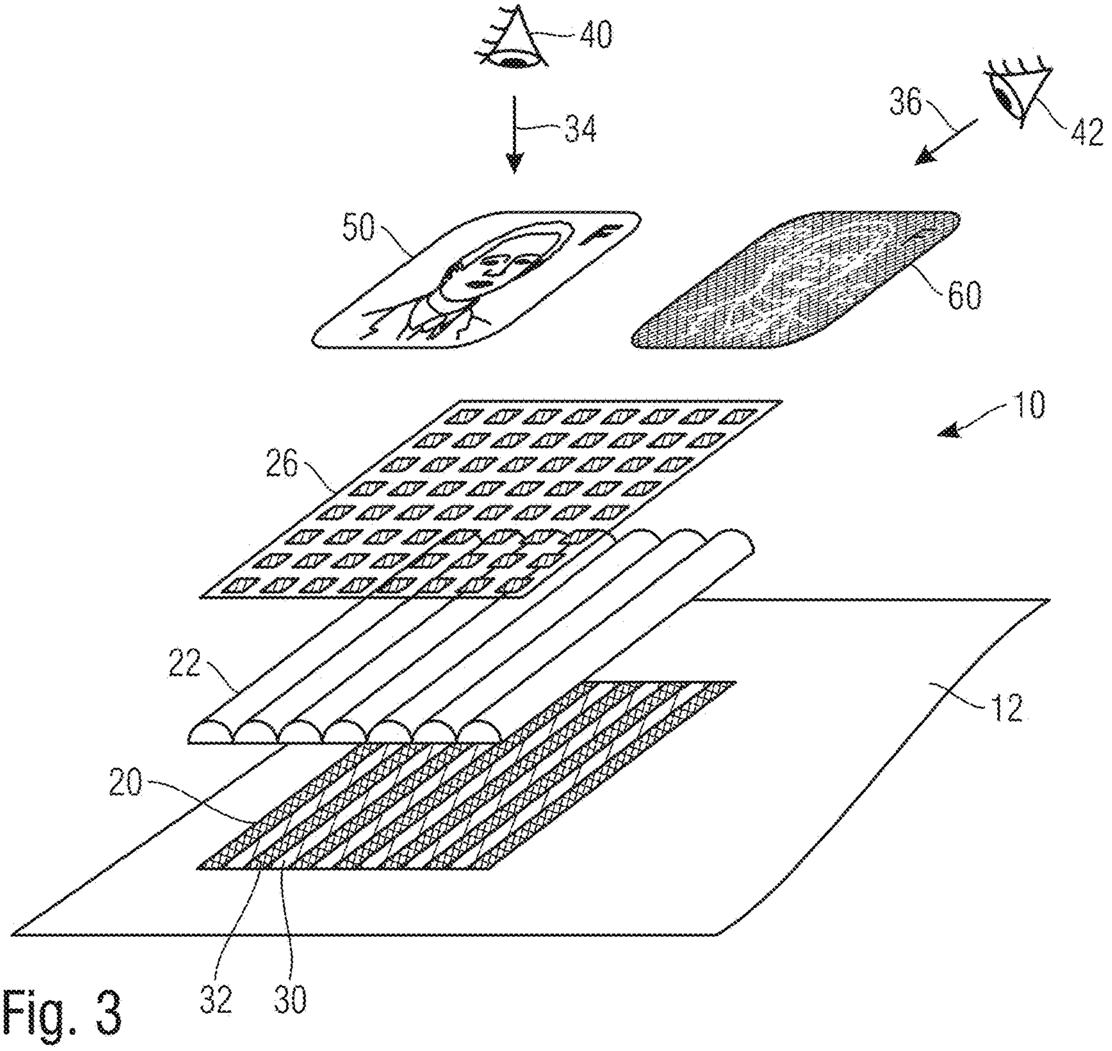
Figure 4:
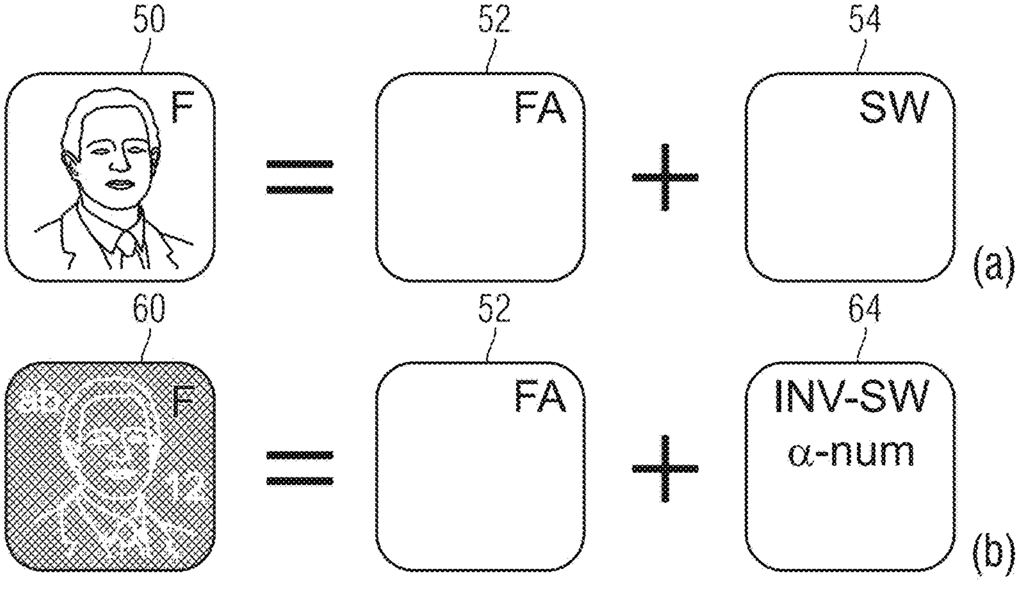

In the figures:

FIG. 1 shows schematically an identification card according to the invention in plan view, FIG. 2 shows a cross-section of the identification card in the personalisation area along the line II-II of FIG. 1, FIG. 3 shows schematically the elements determining the appearance of the identification card in an exploded view, and FIG. 4 in (a) and (b) shows the composition of the identification image and the control image from partial images.

The invention will now be explained using the example of identification cards. FIG. 1 shows in plan view a schematic representation of an identification card 10, such as an identity card in credit card format.

The identification card 10 contains a carrier 12, which has a personalization area 14 in a partial area for receiving image information that serves to identify the holder of the identification card 10. In addition to the personalization area 14, the identification card 10 typically also contains a bibliography area 16 for receiving further information, for example about the card holder and the identification card itself.

In the personalization area 14, when looking vertically onto the identification card 10, a colour passport photo of the holder is visible, which is designated hereinafter as identification photo 50. In the figures, the letter “F” indicates that the identification photo 50 is coloured and is not itself part of the identification photo.

If the identification card 10 is viewed from an oblique viewing angle, for example at an angle of 30° to the vertical, a control image 60, described in more detail hereinafter, appears instead of the identification image 50, which also shows the holder of the identification card 10 in colour, but which has a black-and-white portion that is inverted compared to the identification image 50 and which also shows additional alphanumeric information, for example the name and/or date of birth of the holder.

For a more detailed explanation of the structure, production and functioning of identification documents according to the invention, FIG. 2 shows a cross-section of the identification card 10 in the personalization area 14 along the line II-II of FIG. 1, FIG. 3 shows schematically the elements crucial for the appearance of the card 10 in an exploded view, and FIG. 4 shows in (a) and (b) the composition of the identification image and the control image from partial images.

Referring firstly to FIG. 4(*a*), to produce the identification card 10, a colour identification image 50 of the card holder was created in the form of a colour passport photo and broken down into a colour separation 52 and a black-and-white portion 54. The letters “FA” refer to the colour separation of a colour image, the letters “SW” to a black-and-white image. The black-and-white portion of the identification image 50 forms an independent, black-and-white positive image 54 of the card holder.

In a further step, the contrast of the black-and-white portion 54 of the identification image 50 was inverted to obtain a black-and-white negative image of the card holder. This negative image was then combined with the alphanumeric information, which was also in black-and-white, such as the name and date of birth of the holder and thereby produces an extended black-and-white negative image 64 of the card holder (FIG. 4(*b*)). The letters “INV-SW” indicate a black-and-white image with inverted contrast, the letters “α-NUM” indicate the alphanumeric information contained therein.

By combining the extended black-and-white negative image 64 with the colour separation 52 of the identification image, the colour control image 60 is produced when viewed subsequently from the oblique viewing direction 36. In the control image 60, the card holder can be recognized with his characteristic features, such as a beard or glasses, but also moles, birthmarks, dimples or scars. However, the overall appearance of the control image 60 is modified compared to the identification image 50 due to the inverted contrast of the black-and-white portion 64 and the added alphanumeric information.

With reference now to FIG. 2, the identification card 10 contains a carrier 12 which contains a laser-modified recording layer 20 in the personalization area 14, over which a lens arrangement 22 comprising a plurality of parallel cylindrical lenses 24 is applied. The cylindrical lenses 24 are narrow, cylindrical microlenses with a width below the resolution limit of the human eye, for example, a width of only 100 μm. An optical spacing layer can also be provided between the lens arrangement 22 and the recording layer 20. Is is only important that the distance between the cylindrical lenses 24 and the recording layer 20 substantially corresponds to the focal length of the cylindrical lenses 24, as indicated schematically in FIG. 2.

The recording layer 20 is configured to be laser-sensitive by the addition of an infrared absorber, for example carbon black pigments, and was provided with a desired first image information 30, 32 during the personalization of the identification card 10 by laser exposure.

Specifically, the black-and-white positive image 54 of the card holder was introduced into the recording layer 20 by a vertical laser beam from direction 34 through the lens arrangement 22. Due to the focussing effect of the cylindrical lenses 24, a narrow strip 30 of the positive image is written into the recording layer 20 under each lens. When viewed from the same vertical viewing direction 34, the written-in positive image 54 is reconstructed from the strips 30 for a viewer 40. From oblique viewing angles, however, the viewer looks through the cylindrical lenses 24 onto areas outside the strips 30, so that the positive image is not visible from these oblique viewing angles.

In order to be able to display a coloured identification image 50 with the identification card 10, a rasterized print layer 26 is additionally applied to the lens arrangement 22, which is partially transparent due to its rasterization. The rasterized print layer 26 contains as second image information the colour separation 52 of the identification image 50, which is printed on the lens arrangement 22 registered with the black-and-white positive image 54 formed by the strips 30. As illustrated in the exploded view of FIG. 3, when viewed vertically from direction 34, the viewer 40 sees both the black-and-white positive image 54 and the colour separation 52 registered with it due to the partial transparency of the rasterized print layer 26, so that the two images complement each other to form the coloured identification image 50 for the viewer 40.

In order to further increase the security against forgery of the identification card 10, in addition to the black-and-white positive image 54, the extended black-and-white negative image 64 of the holder was also written into the recording layer 20 during personalization. The negative image 64 was produced by laser exposure from a pre-determined, oblique direction 36, whereby a narrow strip 32 of the negative image is written into the recording layer 20 under each lens due to the focussing effect of the cylindrical lenses 24. When viewed from the same oblique viewing direction 36, the written-in negative image 64 is reconstructed from the strips 32 for a viewer 42. From other oblique viewing angles and from the vertical viewing direction 34, however, the viewer looks through the cylindrical lenses 24 onto areas outside the strips 32, so that the negative image is not visible from these viewing angles.

Due to the small width of the cylindrical lenses 24, the strips 32 and 30 introduced into the recording layer are close to one another, so that the colour separation 52 of the identification image 50, which is printed onto the lens arrangement 22 in a registered manner with the positive image 54, is also arranged in a registered manner with the extended negative image 64. As shown in the exploded view of FIG. 3, the viewer 42 therefore sees both the extended black-and-white negative image 64 and the colour separation 52 registered with it when viewed obliquely from the direction 36 due to the partial transparency of the rasterized print layer 26, so that the two images complement each other for the viewer 42 to form the coloured control image 60.

The inventive combination of a coloured identification image 50 with a coloured control image 60 with inverted black-and-white contrast visible from a different angle offers a number of advantages:

Firstly, the coloured identification image 50 enables the card holder to be securely identified. The use of colour printing for the rasterised print layer 26 and of laser technology for producing the black-and-white information 30, 32 offers a high level of security against forgery and results in a visual appearance with a high level of attention and high recognizability.

The additionally provided coloured control image 60 with inverted black-and-white contrast significantly increases the security against forgery of the card. In order to manipulate the card, it is then no longer sufficient to change the positive image 54, for example by adding a beard; inverse changes would have to be made to the negative image 64 at the same time. This constitutes a major hurdle, since although additional blackening (beard) can possibly be created in the strips 30 of the positive image 54 by further laser exposure, it is virtually impossible to produce a corresponding lightening in the strips 32 of the negative image 64 by laser exposure. The manipulation attempt is therefore immediately recognizable when comparing the identification image 50 with the control image 60.

Both the identification image 50 and the control image 60 can take up a relatively large area 14 on the identification card 10. As a result, on the one hand the security control image 60 is easily recognizable and on the other hand the large identification image 50 is suitable for video identification processes with a smartphone such as video identification.

The overlay of several security features in the same surface area 14 saves space and the lens structure 22 is advantageously used multiple times. As a result, there is more space for further information or security features on the limited surface of an identification document. Finally, the negative image 64, as described above, can accommodate further alphanumeric information, such as the name or date of birth of the holder, but also card-related information, such as a card number, an issue date and the like, which provide an additional security effect. This alphanumeric information can be repeated or supplemented elsewhere in the identification document in order to make consistent manipulation even more difficult or even impossible.

Since the appearance depends on the viewing angle, attempts at manipulation, such as overprinting with UV varnish or grinding down the lens arrangement with the partially transparent print layer or the recording layer, are immediately recognizable as such.

REFERENCE LIST

10 Identification card
12 Carrier
14 Personalization area
16 Bibliography section
20 Recording layer
22 Lens arrangement
24 Cylindrical lenses
30 Strips of the positive image
32 Strips of the negative image
34 Vertical direction
36 Pre-determined oblique direction
40 Viewer from vertical direction
42 Viewer from an oblique direction
50 Identification picture
52 Colour separation
54 Black-and-white positive image
60 Control image
64 Extended black-and-white negative image

The invention claimed is:

1. An identification document (10) for identifying a person comprising a coloured identification image (50) of the person, and a carrier (12) which has a personalization area (14) for receiving image information, wherein the personalization area comprises a recording layer (20) for receiving a first image information, a lens arrangement (22) for viewing the first image information and a partially transparent print layer (26) formed on the lens arrangement for receiving a second image information, characterized in that the first image information of the recording layer contains as a first partial image information a black-and-white positive image (54) of the person and as a second partial image information a black-and-white negative image (64) of the person, the positive image (54) and the negative image (64) are each formed from a plurality of partial regions (30; 32) which are arranged in such a nested manner in the recording layer (20) that when viewed through the lens arrangement (22), the positive image (54) is constructed only in a substantially vertical viewing direction (34) and the negative image (64) is only constructed in a pre-determined, oblique viewing direction (36), the second image information of the partially transparent print layer (26) contains a colour separation (52) of the coloured identification image (50) of the person, which is visible in both the vertical and the oblique viewing direction, so that when the identification document is viewed in the substantially vertical viewing direction (34) the coloured identification image (50) of the person is observable due to an interaction of the black-and-white positive image (54) of the recording layer (20) and the colour separation (52) of the partially transparent print layer (26), and when viewed from the oblique viewing direction (36) a coloured control image (60) is observable which is formed through an interaction of the black-and-white negative image (64) of the recording layer (20) and the colour separation (52) of the partially transparent print layer (26).

2. The identification document according to claim 1, characterized in that the recording layer (20) is formed by a laser-modifiable layer which is modified by laser exposure in the partial regions (30; 32) forming the positive image and the negative image.

3. The identification document according to claim 1, characterized in that the coloured identification image (50) of the person is not observable from the pre-determined, oblique viewing direction and the control image (60) is not observable when viewed in the vertical direction.

4. The identification document according to claim 1, characterized in that the partially transparent print layer (26) is formed by a rasterized print layer.

5. The identification document according to claim 4, wherein the rasterized print layer has opaque raster elements and transparent intermediate spaces.

6. The identification document according to claim 1, characterized in that the partially transparent print layer (26) is applied directly to the lens arrangement (22).

7. The identification document according to claim 1, characterized in that the lens arrangement (22) is formed by a relief structure with elevations and depressions located between the elevations, wherein in the case that the partially transparent print layer (26) is formed by a rasterized print layer having a plurality of raster elements, the raster elements of the partially transparent print layer are arranged at least partially in the depressions of the relief structure.

8. The identification document according to claim 1, characterized in that the black-and-white negative image of the person in the recording layer (20) is combined with alphanumeric information which, when viewed through the lens arrangement (22), is also only constructed in the pre-determined, oblique viewing direction and is not observable when viewed in the vertical viewing direction.

9. The identification document according to claim 8, characterized in that the alphanumeric information of the black-and-white negative image is repeated on the identification document outside the personalization area.

10. The identification document according to claim 1, characterized in that the positive image (54) and the negative image (64) are each formed from a plurality of strips (30; 32) which are alternately present in the recording layer.

11. The identification document according to claim 1, characterized in that the colour separation (62) of the partially transparent print layer (26) is arranged registered to the positive image and negative image of the recording layer (20) formed by the plurality of partial regions.

12. The identification document according to claim 1, characterized in that the partial regions (30; 32) are spaced apart from one another in the recording layer (20), so that when viewed, there is a neutral viewing direction area between the vertical viewing direction and the pre-determined oblique viewing direction, in which neither the positive image nor the negative image is constructed.

13. The identification document according to claim 1, characterized in that the lens arrangement (22) is formed by a plurality of parallel cylindrical lenses (24).

14. The identification document according to claim 13 wherein the cylindrical lenses have a width of 165 μm or less.

15. A method for producing an identification document according to claim 1, in which a colour identification image (50) of a person is provided and is broken down into a colour separation (52) and a black-and-white portion, wherein the black-and-white portion of the identification image represents a black-and-white positive image (54) of the person, the black-and-white positive image is inverted in contrast to obtain a black-and-white negative image (64) of the person, a document blank is provided with a carrier which has a personalization area with a laser-sensitive recording layer (20) for receiving a first image information and a lens arrangement (22) for viewing the first image information of the recording layer (20), the document blank is exposed to laser radiation from a vertical exposure direction (34) through the lens arrangement (22) in order to introduce the black-and-white positive image (54) into first partial areas (30) of the recording layer, the document blank is exposed to laser radiation from the pre-determined oblique exposure direction (36) through the lens arrangement (22) in order to introduce the black-and-white negative image (64) into second, different partial areas (32) of the recording layer (20), and a partially transparent print layer (26) is formed on the lens arrangement (22), which contains the colour separation (52) of the identification image as second image information.

* * * * *